United States Patent
Müller et al.

(10) Patent No.: US 6,356,541 B1
(45) Date of Patent: Mar. 12, 2002

(54) DEVICE FOR TRANSMITTING COMMUNICATIONS DATA OF A COMPUTER VIA A COMMUNICATION NETWORK

(75) Inventors: Wilhelm Müller, Wörth; Seppo Takanen, München, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/436,477

(22) Filed: Nov. 8, 1999

Related U.S. Application Data

(63) Continuation of application No. PCT/DE98/01225, filed on May 4, 1998.

(30) Foreign Application Priority Data

May 6, 1997 (DE) .......................................... 197 19 164

(51) Int. Cl.⁷ .............................................. H04L 12/66
(52) U.S. Cl. ...................................... 370/338; 370/352
(58) Field of Search .......................... 370/338, 352–356, 370/252, 254

(56) References Cited

U.S. PATENT DOCUMENTS

| | | |
|---|---|---|
| 5,682,460 A | 10/1997 | Hyziak |
| 5,983,090 A | * 11/1999 | Aoki ........................ 455/403 |
| 6,023,698 A | * 2/2000 | Lavey, Jr. et al. ............ 707/10 |

FOREIGN PATENT DOCUMENTS

| | | |
|---|---|---|
| DE | 19516364 A1 | 11/1995 |
| EP | 0695075 A1 | 1/1996 |
| GB | 2283154 A | 4/1995 |
| WO | WO 94/28683 | 12/1994 |

\* cited by examiner

*Primary Examiner*—Melvin Marcelo
(74) *Attorney, Agent, or Firm*—Herbert L. Lerner; Laurence A. Greenberg; Werner H. Stemer

(57) ABSTRACT

A device for transmitting communications data between a computer and further computers of a computer network, in particular the Internet, via a communications (i.e. telephone) network. The device has a memory for storing address data which contains at least two different Internet addresses or telephone numbers of the communications network at which a user can access the computer network. A selection unit selects the most economical Internet access, or the respective telephone number of the Internet provider, as a function of the cost data provided for each of the stored Internet addresses.

26 Claims, 2 Drawing Sheets

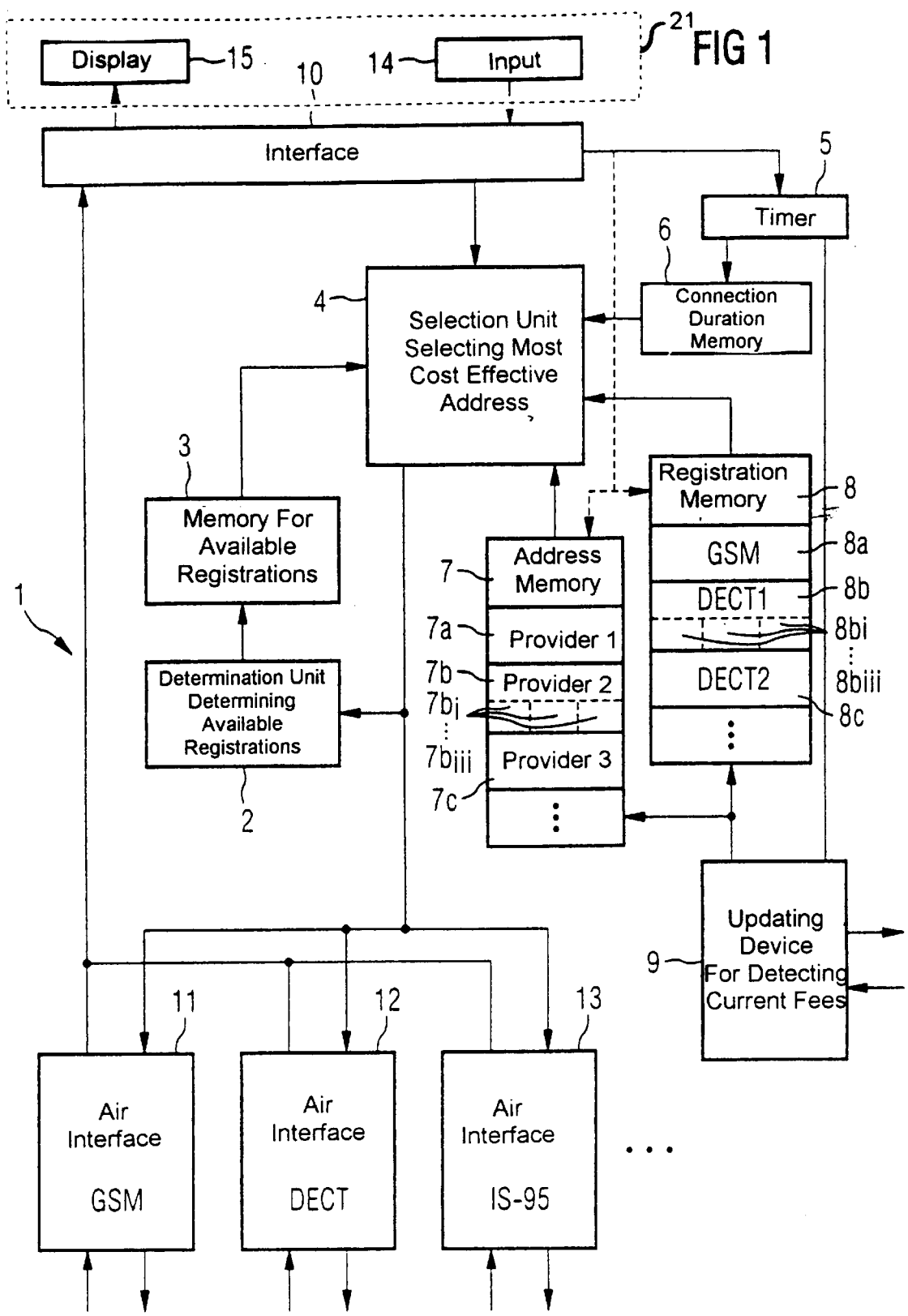

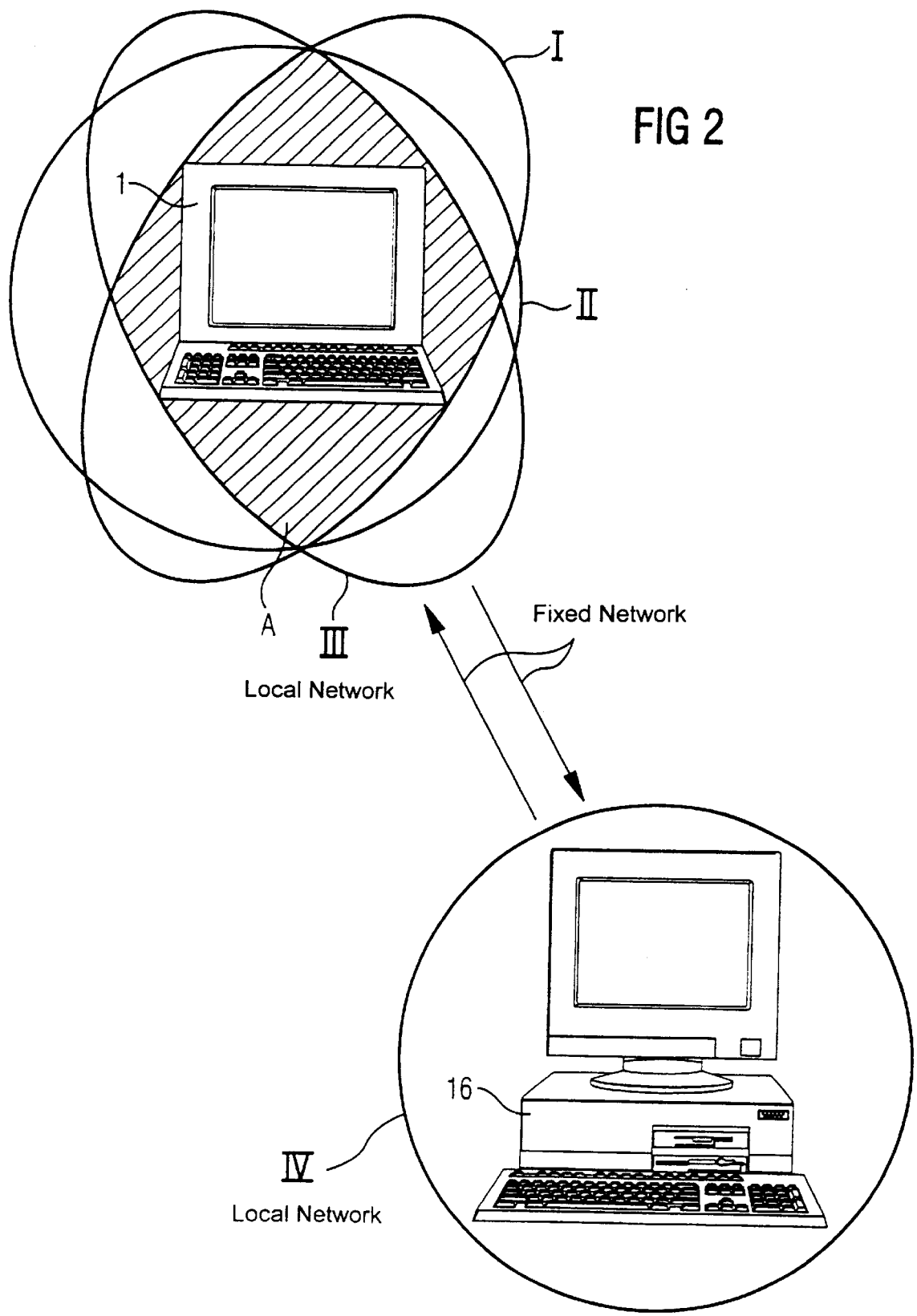

DEVICE FOR TRANSMITTING COMMUNICATIONS DATA OF A COMPUTER VIA A COMMUNICATION NETWORK

CROSS-REFERENCE TO RELATED APPLICATION

This is a continuation of copending International Application PCT/DE98/01225, filed May 4, 1998, which designated the United States.

BACKGROUND OF THE INVENTION

Field of the Invention

The present invention relates to a device for transmitting communications data of a computer via a communications network, in particular via a public telephone network.

Communication and exchange of data between computers has become much more significant in the last few years. In particular, owing to the continuous growth of the international computer network that is known for short as the "Internet", the exchange of data between internationally networked computers has become more and more important.

The Internet is a connection of several thousand computer networks. At present, approximately 40 million subscribers have access to over 3 million computers via the Internet. The Internet has become established in particular on the basis of a service which is known as the World Wide Web (WWW).

The World Wide Web makes it possible to view documents in graphic form. The documents can include sound sequences and video sequences as well as graphics and connections to other documents. These are therefore documents that are not only suitable for reading but can also be used to execute commands. By clicking on a graphic with the computer mouse, a new document can thus be called and a connection can be set up to a computer that may be thousand of kilometers away.

Apart from the World Wide Web, a large number of other services are offered on the Internet. The most well known is probably so-called e-mail, which enables electronic mail to be sent via the public communications network, i.e. the public telephone network.

By connecting a computer or personal computer to the Internet, the user can then access all the other computers connected to the Internet and use the data or services that are made available on the individual computer.

A user obtains access to the Internet via a central computer of a service provider, the service provider usually charging a certain use fee for providing access to a central computer.

Since the user uses his computer to access the central computer via the public telephone network, the telephone charges that are incurred during the communications link also have to be paid.

An analog modem or an integrated services digital network (ISDN) card, which has to be inserted into the personal computer (PC) serves as the interface between the computer and the public telephone network. For ISDN operation, external devices are also known whose appearance is similar to that of a modem and which are connected, like a modem, to the telephone network on the one hand and to a (serial) interface of the computer on the other.

A user of the Internet usually has access authorization to just one service provider. However, the service providers frequently make available a number of telephone addresses at different local access points for the user so that the user can select the access point which is nearest to his location in order to minimize the telephone charges. In addition to the telephone charges, there are also the use fees to be paid to the service provider before authorization for access to the Internet, the fees and charges being determined according to the period of use and possibly also the time of day or weekday.

However, a user frequently also has a number of access authorizations to different service providers so that for the user there is the need, whenever he accesses the Internet, to minimize the costs incurred and as far as possible make use of the cheapest service provider.

SUMMARY OF THE INVENTION

It is accordingly an object of the invention to provide a device for transmitting communications data of a computer via a communications network that overcomes the above-mentioned disadvantages of the prior art devices of this general type, for transmitting communications data of a computer via a communications network, in particular a public communications network, the fees incurred for a user while he is connected to the Internet being minimized.

With the foregoing and other objects in view there is provided, in accordance with the invention, a device for transmitting communications data of a computer via a communications network, including a circuit containing:

an address-data memory for storing address data and storing at least two different addresses of the communications network from which a user is authorized to access a computer network, the address-data memory further storing associated cost data corresponding to the addresses;

a selection unit connected to the address-data memory, the selection unit selecting a most economical address of the addresses of the communications network relating to the computer network in dependence on the cost data corresponding to the addresses; and at least one transceiver unit for setting up a communications link to the most economical address selected by the selection unit and via which the communications data are transmitted.

In particular, the present invention is based on the object of providing a device of the type mentioned at the beginning with which, when mobile terminals are used, not only the use fees that are incurred by the access to a service provider but also the fees that are incurred for using the public communications network, i.e. the public telephone network, during the communications link, are minimized.

The device according to the invention has memories in which at least two different addresses of a service provider or different service providers at which a user can access a central computer of a service provider via the public telephone network, and thus access to the Internet, is provided. The present invention is however not restricted to access to the so-called Internet but can also be applied to a computer network of any other configuration on which access authorizations are offered by specific providers.

When an Internet access command is received, the selection unit of the device according to the invention checks the individual stored addresses and, taking into account cost data provided for each address, selects the access address of the provider which is the most economical one for the user.

It is advantageous that the addresses stored in the memory do not relate to just one service provider but instead the user has access authorizations to the Internet via various service providers, so that at least one access address is stored for each service provider in the memory. In addition to the addresses of the public telephone network, the respective fee data are also stored for each service provider. Therefore, when an Internet access command is received, the device according to the invention automatically selects the service provider that is the most economical for the user as well as the most economical address of the service provider.

The device according to the invention can be implemented in the form of an analog modem or of an ISDN card or a corresponding external ISDN device. In addition, analog modem cards that can be installed internally in the computer like an ISDN card are also known. While the modems operate in analog fashion, the ISDN modules are digital variants of a modem.

Since the Internet addresses stored in the memory of the device according to the invention usually relate to different types of access, so that the telephone charges incurred during a connection via the corresponding addresses— which are not always determined according to connection time but may also be distance-dependent—may be of different levels. The selection of the service provider which is most economical for a user, or of the most economical Internet address, is carried out not only taking into account the access fees which are respectively charged by the service providers but also the telephone charges which are incurred during the communications link to the respective central computer. In this context, it is to be expressly noted that in the present application the term "Internet address" or "address" always refers to a telephone number at which a central computer of a service provider can be accessed via the public communications or telephone network in order to establish a link to the Internet.

The device according to the invention can be used in a stationary way in conjunction with the fixed telephone network.

However, it is particularly advantageous to use the device according to the invention in a mobile terminal. That is to say for example in a portable personal computer (usually referred to as a portable or a laptop) or in a mobile modem or ISDN device, the mobile terminal authorizing a user for at least two different mobile radio registrations which may also involve different communications standards. For example, a device which can be coupled to computers in order to transmit data by mobile radio in and under the designation "Radio Network Termination" (RNT) is known. It is also conceivable for the device according to the invention to contain a commercially available mobile phone that is connected to the selection unit and is appropriately actuated by them.

At present, various mobile radio systems and communications standards are known.

Since 1992, the so-called global system for mobile (GSM) communication has been in operation in Western Europe and this system has also subsequently been adopted in a large number of countries outside of Western Europe, for example in Australia, China, Russia and Singapore etc. In Germany, two licenses have been awarded for digital GSM networks, which were received by DeTe Mobil GmbH on the one hand and Mannesmann Mobilfunk on the other. The GSM networks that have been made available by the two operators are two physically separate mobile radio networks with their own transmission stations. DeTe Mobil GmbH operate their GSM network under the name "D1" while the GSM network operated by Mannesmann Mobilfunk is known under the name "D2". Generally, the transmission of digital data in the GSM network from a mobile station, for example a cordless telephone or a mobile phone, to the stationary base station is usually carried out in a frequency range between 890 and 960 MHz. In addition to the D1 and D2 licenses, a third mobile radio license has been awarded in Germany for the so-called digital cellular system (DCS) 1800 mobile radio system. The DCS 1800 mobile radio system has been in operation in Germany as the "E1" network since 1994 and is virtually identical to the GSM system apart from the frequency range, the DCS 1800 system operating in a frequency range of about 1800 MHz. The DCS 1800 mobile radio system is also referred to as personal communication services (PCS) in the USA or as personal communication network (PCN) in Europe.

Further known mobile radio system standards are the American digital advanced mobile phone system (D-AMPS) standard which is also referred to as IS-54 (Interim Standard 54). Furthermore, the IS-95 system is also used in the USA. The Japanese digital cellular (JDC) standard is also known in Japan, and it is also referred to as the personal digital cellular (PDC) standard.

Finally, the digital enhanced cordless telecommunications (DECT) standard is also known; however, the standard is not in the real sense a mobile radio standard but rather a standard for cordless telephones. DECT does not specify a network for mobile communication but rather defines only the air interface between a base station and a mobile unit. The DECT standard is the ideal standard within spatially defined areas, it being impossible to implement (yet) a DECT network with wide area coverage owing to the relatively short range of the base station (between 30 and 300 m).

The mobile radio systems are usually of cellular configuration, i.e. the entire area which is to be covered is divided into relatively small radio zones, so-called radio cells. Each radio cell being assigned a base station whose reception range is limited to the respective radio cell. Therefore, within a radio cell a mobile unit always communicates with the base station that is responsible for the radio cell. If a mobile unit moves out of the coverage area of its base station, the connection has to be made via a different base station, this taking place by an automatic change of the radio zone without the quality of the ongoing connection being significantly disrupted. This procedure is referred to as "handover". On the other hand, the PCS or PCN system contains individual local networks that may in turn be configured as cellular networks but the individual local networks are connected to one another through the fixed network. The PCS and PCN systems thus cover not only the entire area with radio zones but also mobile radio transmissions take place only within the individual local networks, while the transmission of data takes place between the individual local networks via the fixed network. In particular for the American PCS systems, the DCS 1800 Standard was further developed to form the DCS 1900 Standard whose frequency range is shifted by 100 MHz in comparison with the DCS 1800 Standard.

The previously described known mobile radio standards differ not only in terms of frequency range but also in terms of other essential technical parameters such as the channel spacing, the multiplexing method, the modulation method or the number of channels present per carrier frequency. However, more details will not be given of the individual technical differences at this point.

In addition to the actual mobile radio network operators, there may also be different service providers for each mobile radio standard, the service providers purchasing access to the corresponding mobile radio networks and offering the services to the end customers for the payment of a service fee. In Germany there are more than ten service providers that have each purchased access to the D1, D2 and E1 networks and offer chargeable mobile radio services. Depending on the range of the individual providers and of the individual mobile radio networks, the customer thus has the choice not only between different mobile radio systems but also between the different service providers within the individual mobile radio systems. The transmission fees for the use of the mobile radio network which are charged to the customer by the individual mobile radio network operators or service providers, and possibly fixed network fees for the use of the fixed network may differ significantly from one another.

Consequently, according to a preferred refinement the device according to the invention additionally has a further memory in which user-specific registration data that corresponds to at least two different registrations are stored. Registration is understood here to be authorization of a user to make use of the services of a mobile radio network operator or of a corresponding service provider, such registrations being usually chargeable. Each registration thus corresponds to a specific mobile radio network operator or a service provider and a specific communication standard of the previously described communication standards.

In the selection of the Internet address that is most economical for the user, the selection unit thus takes into account not only the fees which are stored for the individual Internet service providers or Internet addresses but also the fee data that are made available for the individual mobile radio registrations of the user. The fee data of the individual mobile radio network operators or mobile radio service providers are also usually determined both as a function of the duration of the connection and of the weekday or time of day. Thus, even if there is only one Internet address for the user, the selection unit of the device according to the invention can minimize costs by selecting for this Internet address the mobile radio registration which is the cheapest out of all such registrations which are suitable and available for connection to the Internet address.

If not only a plurality of Internet service providers with, in each case, a plurality of Internet addresses, but also a plurality of mobile radio registrations of the user are available, the selection unit determines the Internet address which is the most economical for the user on the basis of an assessment of all the available fee data.

Therefore, for each individual, stored Internet address the selection unit determines which of the mobile registrations which the user is authorized to use are suitable and available for the connection setup. For each combination of the Internet addresses with the suitable mobile radio registrations, the expected connection costs and access costs are determined, both the fees which have to be paid to the respective Internet service provider for Internet access and the fees which have to be paid to the respective mobile radio service provider for making use of the respective mobile radio network are taken into account. If it is also necessary to use the fixed network to set up the connection between the user and the desired Internet address, the fixed net fees are also taken into account.

Since the fees are usually dependent on the duration of the connection, a specific default value, for example 15 minutes, is initially adopted for the duration of the connection when determining the expected fees. This standard default value can continuously be updated and correspond, for example, to the mean value of the durations of the last three connections. In this way, the selection unit of the device determines the Internet address that is most economical for the desired Internet access of the user, i.e. the most economical Internet service provider and the corresponding most economical telephone number of the Internet service provider in order to be able to access the central computer of the provider, and the mobile radio service provider, or mobile radio registration which is cheapest for the telephone connection between the computer of the user and the central computer of the selected Internet service provider. The connection setup between the computer and the central computer of the selected Internet service provider is subsequently carried out by dialing the respective telephone number using the selected mobile radio standard or communications standard. If the registrations that are stored in the device relate to different communications standards, it is necessary to provide for each of the communications standards a separate air interface, i.e. a separate transceiver unit, the communications data which are to be transmitted being coded and demodulated, or decoded and demodulated etc., by the unit in accordance with the technical features of the individual communications standards.

Advantageously, the fee data which are stored for the individual registrations and the individual Internet access authorizations in the device are automatically updated at regular intervals, which can be carried out, for example, by a mobile radio signal in the form of an interrogation addressed to a central information station or by an Internet access to a respective service provider which makes available all the fee data. In particular, the updating advantageously takes place in a way that is not apparent to the user.

So that the device can also be used for different users, the Internet address memory and the registration data memory (which relate to various user-specific mobile radio registrations), may be interchangeable so that a user merely has to plug into the device a chip card which is provided with the appropriate memory, in order subsequently to be able to operate the device with his user-specific Internet access authorizations or mobile radio registrations.

The individual Internet address data or mobile radio registration data can be input by the user—for example by a keyboard of a computer. These data can also optionally be represented on a display device, for example the screen of the computer, with the result that the user can make his selection of the Internet address or the Internet service provider as well as of one of the available mobile radio registrations, and the selected data can no longer be changed by the selection unit.

Other features which are considered as characteristic for the invention are set forth in the appended claims.

Although the invention is illustrated and described herein as embodied in a device for transmitting communications data of a computer via a communications network, it is nevertheless not intended to be limited to the details shown, since various modifications and structural changes may be made therein without departing from the spirit of the invention and within the scope and range of equivalents of the claims. The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, block diagram of a preferred exemplary embodiment according to the invention; and FIG. 2 perspective view of a representation in order to clarify the principle on which the preferred exemplary embodiment is based.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a block circuit diagram which relates to a preferred exemplary embodiment of a device 1 according to the invention. The device 1 according to the invention is implemented in the form of a mobile terminal that, for a specific user, has access authorizations both to a plurality of Internet service providers and to a plurality of mobile radio service providers. Furthermore, the device 1 according to the invention can be operated by a plurality of air interfaces 11–13, i.e. a transmission of the communications data from the device 1 to a central computer of a selected Internet service provider can take place using different mobile radio standards.

A significant component of the block circuit diagram illustrated in FIG. 1 is a selection device 4 together with memory devices 7 and 8. The memory devices 7 and 8 may be provided, for example, in the form of chip cards which can easily be exchanged in order, in this way, to permit the device represented in FIG. 1 to be operated by different users with the respective appropriate user-specific data.

As has already been described above, the address memory 7 in the exemplary embodiment illustrated in FIG. 1 contains access addresses 7a–7c of different Internet service providers, and—as is represented with reference to provider 2—each provider may possibly offer a plurality of addresses 7bi–7biii.

The registration memory 8 stores various mobile radio applications 8a–8c of the user. Each of these applications corresponds to an authorization of the user allowing him to operate the mobile radio network which is associated with the registration, or to make use of the mobile service provider which is associated with the registration. As with the Internet service providers, a user usually acquires the use authorization by concluding a contract with the respective mobile radio network operator or mobile radio service provider. The mobile radio applications 8a–8c which are stored in the memory 8 may relate to different mobile radio networks, i.e. different mobile radio standards, such as the GSM network, the DCS 1800 network, the D-AMPS network, the DECT network or the IS-95 network etc. On the other hand, the mobile radio registrations 8a–8c can, however also relate to different registrations within one and the same mobile radio standard. Since there are a plurality of service providers within one mobile radio network, i.e. companies which have purchased access to the respective radio mobile network and then offer the mobile radio services to the end customer for the payment of a service fee, different mobile radio registrations are also possible within one and the same mobile radio network. The different mobile radio registrations being able to relate to different service providers. Thus, one mobile radio registration can relate, for example, to the so-called D1 network and another mobile radio registration can relate to the so-called D2 network within the GSM mobile radio network. Likewise, it is conceivable for the different registrations to relate to the same mobile radio network and the same mobile radio service provider, but merely be associated with different access authorizations because, for example, it is possible to conclude with one and the same mobile radio service provider different contracts for different call numbers, under which contracts it may also be possible, in particular, for different service rates to apply. In particular the digital enhanced cordless telecommunications—generic access profile (DECT-GAP) standard permits a plurality of registrations using the DECT standard per terminal. It being possible, for example, for one registration to relate to the private line, one to the business line and one registration to the connection which is used in public life. The above description makes it clear that the term "registration" in the present invention is to be interpreted in the most general sense and designates in each case an individual access authorization to a mobile radio network or a mobile radio service provider within a mobile radio network.

In the exemplary embodiment shown in FIG. 1, the registration memory 8 contains three different registrations 8a–8c. The registration 8a designates an access authorization to a GSM mobile radio network, the registration 8b designates an access authorization to a first DECT mobile radio network and the registration 8c designates an access authorization to a second DECT mobile radio network. Further registrations, which, for example, in the USA, may relate to the mobile radio standards D-AMPS or IS-95, may be provided in the registration memory 8. The registration 8b that is illustrated in FIG. 1 and which relates to the first DECT mobile radio network is divided into three sub-identifiers 8bi–8biii. The sub-identifiers or sub-registrations relate, as has already been described above, to different access authorizations within one and the same DECT-1 network, which can relate, for example, to a private line, a business line or a line of the mobile radio subscriber which is used in public life. In this case, it may be necessary to correct the Internet telephone number selected by the selection device 4, i.e. the destination call number that is to be called by the device illustrated in FIG. 1. If in fact the registration, selected for the most economical Internet access, selected by the selection device 4 from the registrations stored in the memory 8 relates to a sub-registration for a connection via a telephone local branch exchange, the selection device 4 has to expand the predefined destination call number with the office code, usually "0" in order to be able to telephone from the private branch exchange to the outside.

In each case the respectively valid service fee (toll) data or service rates are stored for the Internet service providers in the memories 7 and 8 and their Internet addresses or mobile radio service providers as well as sub-registrations which may be present for them.

The method of operation of the mobile device 1 according to the invention that is illustrated in FIG. 1 for transmitting communications data of a computer via the public telephone or communications network is now described.

The device 1 as shown in FIG. 1 is coupled via an interface 10, in particular via a serial interface, to a personal computer (PC) 21 or integrated in it. A user transmits via a keyboard 14 or via comparable input devices, such as a mouse, an instruction to dial up the Internet, which instruction is fed to the selection device 4 via the interface 10. Consequently, the selection device 4 accesses the address data or registration data stored in the memories 7 and 8 and the respective service fee data that are also stored in them. For each possible Internet destination address stored in the memory 7, the selection device 4 checks which of the registrations or sub-registrations which are defined in the memory 8 are possible, and are available, for the telephone connection to the corresponding Internet address.

The Internet destination addresses stored in the memory 7 also include the corresponding code number or local area code so that the selection device 4 can use the Internet destination addresses or the corresponding destination call numbers which are stored in the memory 7 to determine the location of the corresponding central computer, which is to be accessed, of the respective Internet service provider. In order to determine, for the connection setup to the Internet destination addresses or destination telephone numbers stored in the memory 7, the most economical registration of the registrations stored in the memory 8, it is initially necessary to be able to determine unambiguously the transmission link leading from the device shown in FIG. 1 to the central computer which is to be accessed. For this purpose, it is necessary to determine not only the location of the destination terminal but also the mobile radio service provider which can be accessed, i.e. is available, at the location of the mobile device 1 which is shown in FIG. 1. This is carried out by the procedures specified in the relevant radio standards, using a determination unit 2 that determines, by the individual air interfaces 11, 12 and 13 provided in the device 1, the registrations which are available at the location of the mobile radio subscriber, i.e. the mobile radio network operator and/or mobile service provider, and stores them in a memory 3 which is continuously updated. By accessing the memory 3, the selection device 4 is continuously informed as to which of the registrations stored in the memory 8 are actually possible for the connection to the Internet service providers which are to be accessed via the individual Internet addresses stored in the memory 7.

This will be explained in more detail with reference to FIG. 2. FIG. 2 shows by way of example the spatial range of three different mobile radio networks I–III, which intersect spatially in the region A represented with hatching, in which there is a portable computer or laptop equipped with the device 1 according to the invention shown in FIG. 1. In the region A that is represented with hatching marks, the mobile radio subscriber accordingly has the selection between each of these three mobile radio networks I–III. The example illustrated in FIG. 2 shows an American PCS system in which the local networks I–III are connected via a fixed network to a local network IV in whose base station area a central computer 16, which is to be accessed, of an Internet service provider is located. Consequently, the mobile radio subscriber using the device 1 according to the invention must firstly set up a link from the mobile device according to the invention to the corresponding base station of the mobile radio network selected by him, so that subsequently the communications data which are to be transmitted can be transmitted from the base station via the fixed network to the base station which is responsible for the local network IV, in order to establish the connection between the device 1 and the central computer 16. Here, the caller must, in a first instance, pay the transmission fees for the connection between the mobile device 1 and the base station, i.e. the transmission fee for making use of the respective mobile radio network, the telephone charges for the transmission via the fixed network and the access fees for making use of the Internet access of the central computer 16. Of course, the central computer 16 can also be connected directly to the fixed network. Because the GSM networks have wide coverage in Western Europe, it is not necessary to transmit the communications data via the fixed network so that in this case no service fees are incurred for fixed-network transmission.

The service fee data that apply to the individual Internet destination addresses or mobile radio registrations are also stored in the memories 7 and 8 and in this way made available to the selection device 4. If data transmission is also necessary via the fixed network (see FIG. 2) for the connection setup to the central computers which are assigned to the individual Internet destination addresses, the applicable fee rate of the fixed-network operator or operators must be communicated to the selection device 4 in a similar way. Because experience has shown that the fee rates of the Internet service providers or mobile radio network providers as well as of the mobile radio service providers change from time to time, an appropriately provided updating device 9, which is actuated by an internal timer 5, for example an oscillator, updates the service fee data in the memories 7 and 8 at regular intervals.

Thus, for example, the updating device 9 can set up a link, which is imperceptible to the user, to a central information station or an Internet service provider. The link makes available the respectively valid service fee rates of all the Internet service providers and mobile radio service providers, and, as a result of an appropriate interrogation signal, transmits them to the updating device 9 which subsequently stores the current fee data in the memories 7 and 8.

The selection device 4 can operate with any combination of the Internet addresses stored in the memory 7, with the registrations, available at the location of the device 1, of the memory 8. The available registrations, which determine expected transmission costs and with costs for the use of the Internet being stored in the memory 3. However, since these costs are usually dependent on the transmission time, i.e. on the duration of the connection, when it is determining the most economical Internet service provider or mobile radio service provider the selection device 4 must assume a predefined value for the connection period. For this purpose, in an appropriately provided memory 6, a standard value, i.e. a default value which is used as a standard by the evaluation device 4 during the determination or selection can be stored. Alternatively, the user can communicate the expected duration of connection to the selection device 4 via the keypad 14. It is also conceivable for the content of the connection-duration memory 6 also to be continuously updated on the basis of the last connections which are set up, and continuously update its memory, in that, for example, the mean value of the, for example, the last three connections is stored as standard value for a new communications connection. Of course, the mean value can also be determined from a larger or smaller number of previous connections.

On the basis of the information mentioned above, the selection device 4 can now determine the Internet service provider that is the most economical one for the desired Internet access. Or the most economical Internet address of the provider as well as the mobile radio registration of the memory 8 which is the most economical for the connection setup to the central computer of the Internet service provider, in order, in this way, to minimize the overall costs or overall charges associated with the access to the Internet.

After the selection of the Internet address or destination telephone number of the memory 7 and mobile radio registration of the memory 8 which correspond to the minimized overall costs, the selection device 4 controls, as a function of the mobile radio standard corresponding to the selected mobile radio registration of the memory 8, the transceiver unit 11–13 which is provided for the mobile radio standard. In the exemplary embodiment shown in FIG. 1, the transceiver units or the air interfaces 11 and 12 are provided for the mobile radio standards GSM and DECT in accordance with the registrations 8a–8c stored in the memory 8. If the mobile device 1 is also to be used to transmit communications data using different mobile radio standards, additional transceiver units must be appropriately provided. Thus, an air interface 13 is, for example, additionally provided for the IS-95 standard in FIG. 1. By actuating the air interface 11–13 that corresponds to the selected mobile radio registration, the selection device 4 accesses the Internet address, also selected by it, of a corresponding Internet service provider and thus sets up the communications link for transmitting the data generated by the computer to the corresponding central computer. The communications data transmitted via this connection path are encoded, modulated and transmitted to the respective base station in accordance with the technical data of the respective mobile radio standard by the air interface 11, 12 or 13 activated by the selection device 4. In a similar way, the communications data that are output by the accessed central computer are received, decoded, demodulated and fed via the interface 10 to the central unit of the computer by the respective air interface 11, 12 or 13, it being possible to represent the received data on the screen 1 of the computer.

During a connection, the overall connection costs may change owing to a change in location of the mobile device 1 and/or due to the fact that the initially assumed connection data are exceeded, in such a way that a different, available mobile radio registration of the memory 8 is more economical than the mobile radio registration which was initially selected by the selection device 4. For this reason, the device 2 advantageously continuously determines the registrations available at the location of the user, and the selection device 4 uses the memory 6 and the internal timer 5 to monitor the current duration of connection and continuously calculates the fees which are theoretically incurred for the existing Internet connection and for all the available registrations. If one of the mobile radio registrations which are stored in the memory 3 and are currently available or accessible is cheaper than the Internet address of the memory 7 which is selected for accessing the most economical Internet connection, the selection device 4 outputs a corresponding warning signal. The user can then confirm, for example using the keyboard 14, that he wishes to change the mobile radio application. In this case, the selection device 4 brings about a so-called "transfer call", the selection device 4 transmitting an interrogation signal, for the transfer of the existing Internet connection, to an appropriate base station of the mobile radio network which corresponds to the new mobile registration, via that air interface 11–13 which corresponds to the new most economical mobile radio registration. After a confirmation by the base station, the connection can be set up via the new air interface, the old transmission link being interrupted only after the new transmission link is present, i.e. the air interface corresponding to the old mobile radio registration which is selected firstly is deactivated by this selection device 4.

A preferred exemplary embodiment of the device 1 according to the invention is described in FIG. 1 in the form of a mobile terminal. The configuration represented in FIG. 1 is correspondingly simplified for a device operated using the fixed telephone network because, in this case, the components of the device shown in FIG. 1 which are connected to the various mobile radio standards, such as the memory 8, are dispensed with. Furthermore, it is then necessary to have just one telephone interface that encodes and modulates the data transmitted to the telephone network via the computer and decodes and demodulates the incoming data.

We claim:

1. A device for transmitting communications data of a computer via a communications network, comprising:

a circuit, including:

an address-data memory for storing address data and storing at least two different addresses of the communications network from which a user is authorized to access a computer network, said address-data memory further storing associated cost data corresponding to the addresses;

a selection unit connected to said address-data memory, said selection unit automatically selecting a most economical address of the addresses of the communications network relating to the computer network in dependence on the cost data corresponding to the addresses; and at least one transceiver unit for setting up a communications link to the most economical address selected by said selection unit and via which the communications data are transmitted.

2. The device according to claim 1, wherein the address data stored in said address-data memory constitute access authorizations to an Internet provider.

3. The device according to claim 1, including an interface connected to said selection unit, said interface provided for coupling to a computer generating the communications data to be transmitted.

4. The device according to claim 3, wherein said circuit is configured to be installed in the computer.

5. The device according to claim 1, wherein the cost data provided for the addresses contains service fee information for the use of the computer network.

6. The device according to claim 1, wherein the address data contains the addresses of at least two different providers each providing access to a respective computer network, the cost data provided for the addresses being stored in said address-data memory and containing provider-specific use fees for access to the respective computer network.

7. The device according to claim 6, wherein the address data for at least one provider of the at least two different providers contains two different addresses assigned to the at least one provider, and said selection unit selects the most economical provider of the at least two different providers for access to the computer network and selects a most economical address associated with the most economical provider.

8. The device according to claim 1, including an input apparatus for a user-specific inputting and storage of the address data in said address-data memory.

9. The device according to claim 1, including an updating unit connected to said address-data memory and at regular intervals updates the cost data stored in said address-data memory.

10. The device according to claim 9, including a registration-data memory connected to said selection unit for storing registration data corresponding to at least two different registrations and associated registration cost data, each registration of the at least two different registrations authorizing the user to transmit the communications data in accordance with a communication standard corresponding to the registration, the selection unit selecting a most economical address of the at least two different registrations taking into account the registration cost data provided for the registrations, and selecting a most economical registration for transmitting the communications data via the communications network.

11. The device according to claim 10, wherein said circuit transmits the communications data in accordance with at least two different communications standards, and in each case has one of said at least one transceiver unit for each of the at least two different communications standards.

12. The device according to claim 10, wherein said address-data memory and said registration-data memory are interchangeable with one another.

13. The device according to claim 10, wherein said updating unit is connected to said registration-data memory and also at regular intervals updates the registration cost data stored in said registration-data memory.

14. The device according to claim 13, wherein said updating unit regularly interrogates, in response to a mobile radio signal from an information station, new cost data being updated fee rates for the addresses and new registration cost data being updated fee rates for the registrations, and stores the new cost data as the cost data in said address-data memory and the new registration cost data as the registration cost data in said registration-data memory.

15. The device according to claim 10, including an input unit connected to said selection unit for user-specific inputting and storage of the registration data in said registration-data memory.

16. The device according to claim 10, including a determination unit connected to said selection unit, said determination unit ascertaining which of the at least two different registrations stored in said registration-data memory are registrations which are actually available at a location of said circuit.

17. The device according to claim 16, including a registration memory connected to said selection unit, said registration memory continuously storing which of the at least two different registrations are actually available at a given moment.

18. The device according to claim 16, wherein said selection unit selects the most economical address taking into account the registration cost data corresponding to the registrations available at the location of said circuit and containing registration-specific mobile radio service fees and fixed network service fees.

19. The device according to claim 1, wherein said selection unit selects the most economical address in dependence on an expected period of communication.

20. The device according to claim 19, wherein the expected period of communication corresponds to a continuously renewed mean value of a specific number of periods of communication of previous communications links.

21. The device according to claim 16, wherein after the communications link has been set up via the most economical registration to the computer network, said selection unit continuously determines the registrations which are actually available with reference to the computer network and a currently most economically available registration for providing the communications link to the computer network in dependence on the location of said circuit, and said circuit generates a warning signal if the currently most economically available registration deviates from the most economical registration initially selected.

22. The device according to claim 21, wherein after confirmation by the user, said circuit provides a current communications link to the computer network using the currently most economically available registration, and disconnects the communications link which uses the most economical registration initially selected by said selection unit.

23. The device according to claim 10, including a display and an input unit, the address data and the registration data are to be displayed on said display, said input unit provided for stipulating to said selection unit, on a user-specific basis, at least one of a specific address of the addresses and a specific registration of the registrations.

24. The device according to claim 10, wherein said at least one transceiver unit is a component of a mobile phone which is intended for connection to said selection unit.

25. The device according to claim 3, wherein said circuit is configured to be connected to the computer.

26. The device according to claim 13, wherein said updating unit regularly interrogates, in response to a signal from the computer network, new cost data being updated fee rates for the addresses and new registration cost data being updated fee rates for the registrations, and stores the new cost data as the cost data in said address-data memory and the new registration cost data as the registration cost data in said registration-data memory.

* * * * *